United States Patent
Willm et al.

(10) Patent No.: US 11,273,791 B1
(45) Date of Patent: Mar. 15, 2022

(54) SEAT BELT STRUCTURE FOR A VEHICLE

(71) Applicant: Honda Motor Co., Ltd., Tokyo (JP)

(72) Inventors: Michael J Willm, Hilliard, OH (US); Robert T Wilson, III, Massillon, OH (US); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/216,183

(22) Filed: Mar. 29, 2021

(51) Int. Cl.
*B60R 22/30* (2006.01)
*B60R 22/12* (2006.01)

(52) U.S. Cl.
CPC .............. *B60R 22/30* (2013.01); *B60R 22/12* (2013.01)

(58) Field of Classification Search
CPC ................................ B60R 22/12; B60R 22/30
See application file for complete search history.

(56) References Cited

U.S. PATENT DOCUMENTS

| | | | |
|---|---|---|---|
| 3,287,061 A | 11/1966 | Nicholas | |
| 4,231,616 A | 11/1980 | Painter | |
| 4,660,605 A * | 4/1987 | Koch | B60R 22/12 139/117 |
| 5,005,866 A | 4/1991 | Reedom | |
| 7,011,341 B2 | 3/2006 | Herberg et al. | |
| 7,201,399 B2 | 4/2007 | Frank et al. | |
| 7,503,587 B2 | 3/2009 | Corcoran | |
| 7,722,081 B2 | 5/2010 | Van Druff et al. | |
| 7,753,410 B2 | 7/2010 | Coultrup | |
| 7,988,196 B2 | 8/2011 | Wang | |
| 8,182,043 B2 | 5/2012 | Baladi | |
| 2002/0158457 A1 | 10/2002 | Simmons | |
| 2007/0257480 A1* | 11/2007 | Van Druff | B60R 22/30 280/801.2 |
| 2008/0073894 A1 | 3/2008 | Phillips | |
| 2016/0257283 A1* | 9/2016 | Muto | B60R 22/023 |

(Continued)

FOREIGN PATENT DOCUMENTS

| | | | | |
|---|---|---|---|---|
| CN | 204279335 U | | 4/2015 | |
| DE | 10008562 A1 * | 8/2001 | | B60R 21/2165 |
| DE | 102011110864 B4 | | 5/2019 | |

(Continued)

OTHER PUBLICATIONS

Krumma, Machine Translation of DE 10008562 A1 Obtained Nov. 10, 2021, Aug. 30, 2001, Entire Document. (Year: 2001).*

*Primary Examiner* — Jonathan Ng
*Assistant Examiner* — Scott F. Underwood
(74) *Attorney, Agent, or Firm* — American Honda Motor Co., Inc.; Joshua Freier

(57) ABSTRACT

A seat belt structure for a center seat of a vehicle is disclosed. The seat belt structure includes a safety belt webbing mounted to a first side of the seat portion and extending to a first end of the back portion and a buckle mounted to a second side of the seat portion. A tongue is movably connected to the safety belt webbing and is adapted to couple with the buckle to restraint an occupant of the central seat. The seat belt structure also includes a grab structure adapted to be held by the occupant. The safety belt webbing defines a lap belt portion adapted to traverse a lap of the occupant, and a shoulder belt portion adapted to extend diagonally across an upper torso of the occupant, when the tongue is engaged with the buckle. The grab structure is engaged with the lap belt portion.

14 Claims, 5 Drawing Sheets

(56) References Cited

U.S. PATENT DOCUMENTS

2018/0079341 A1    3/2018  Nishimura
2021/0031598 A1*   2/2021  Wilson, III ............. B60R 21/13

FOREIGN PATENT DOCUMENTS

FR          2924074 A1 *  5/2009  ........... B60N 2/2806
JP         2019034577 A   3/2019
WO         1995026791 A1  10/1995

* cited by examiner

SEAT BELT STRUCTURE FOR A VEHICLE

BACKGROUND

The disclosed subject matter relates generally to seat belt structures for vehicles. More particularly, the disclosed subject matter relates to a seat belt structure for a center seat of utility vehicle.

Utility vehicles, generally, include a front bench seat that accommodates three passengers. The handholds for the centre passage are attached to a seat bottom assembly. These handholds are disposed on both sides of the center passenger to accommodate both of the center passengers hands. As the handholds are located between the center passengers leg and the legs of the driver and outboard passenger, the center passenger is touching the leg of the driver and outboard passenger almost continuously which is undesirable. Further, the attachment of the handholds with the seat bottom, requires the attachment of the seat bottom to a vehicle frame with a metal latch to prevent a detachment of the seat bottom from the vehicle frame while driving. The latch and related hardware add cost to the vehicle.

SUMMARY

In accordance with one embodiment of the present disclosure, a seat belt structure for a center seat of a vehicle is disclosed. The center seat includes a seat portion and a back portion extending upwardly from the seat portion. The seat belt structure includes a safety belt webbing adapted to be mounted to a first side of the seat portion and configured to extend to a first end of the back portion. The seat belt structure further includes a buckle adapted to be mounted to a second side of the seat portion, and a tongue movably connected to the safety belt webbing and adapted to move along the safety belt webbing, wherein the tongue is adapted to couple with the buckle to restraint an occupant of the central seat. Moreover, the seat belt structure includes at least one grab structure engaged with the safety belt webbing and adapted to be held by the occupant. The safety belt webbing defines a lap belt portion and a shoulder belt portion when the tongue is engaged with the buckle. The lap belt portion is adapted to traverse a lap of the occupant and the shoulder belt portion is adapted to extend diagonally across an upper torso of the occupant. The at least one grab structure is engaged with the lap belt portion.

In accordance with another embodiment of the present disclosure, a vehicle is provided. The vehicle includes a seat bench having a first side seat, a second side seat, and a center seat arranged between the first side seat and the second side seat. The center seat includes a seat portion and a back portion extending upwardly from the seat portion. The vehicle further includes a seat belt structure to restrain an occupant of the center seat. The seat belt structure includes a safety belt webbing fixedly mounted to a first side of the seat portion and extending to a first end of the back portion, and a buckle mounted to a second side of the seat portion. The seat belt structure further includes a tongue movably connected to the safety belt webbing and adapted to move along the safety belt webbing. The tongue is adapted to couple with the buckle to restraint the occupant of the central seat. Moreover, the seat belt structure includes at least one grab structure engaged with the safety belt webbing and adapted to be held by the occupant. The safety belt webbing defines a lap belt portion and a shoulder belt portion when the tongue is engaged with the buckle. The lap belt portion is adapted to traverse a lap of the occupant and the shoulder belt portion is adapted to extend diagonally across an upper torso of the occupant. Further, the at least one grab structure is engaged with the lap belt portion.

In accordance with yet a further embodiment of the present disclosure a seat belt structure for a center seat of a vehicle is disclosed. The center seat includes a seat portion and a back portion extending upwardly from the seat portion. The seat belt structure includes a safety belt webbing adapted to be mounted to a first side of the seat portion and configured to extend to a first end of the back portion, and a buckle adapted to be mounted to a second side of the seat portion. The seat belt structure further includes a tongue movably connected to the safety belt webbing and adapted to move along the safety belt webbing. The tongue is adapted to couple with the buckle to restraint an occupant of the central seat. Moreover, the seat belt structure includes at least one grab structure engaged with the safety belt webbing. Each grab structure includes a strap defining a handle to be held by the occupant. Further, the safety belt webbing defines a lap belt portion and a shoulder belt portion when the tongue is engaged with the buckle. Also, the lap belt portion is adapted to traverse a lap of the occupant and the shoulder belt portion is adapted to extend diagonally across an upper torso of the occupant. Moreover, the at least one grab structure is engaged with the lap belt portion.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
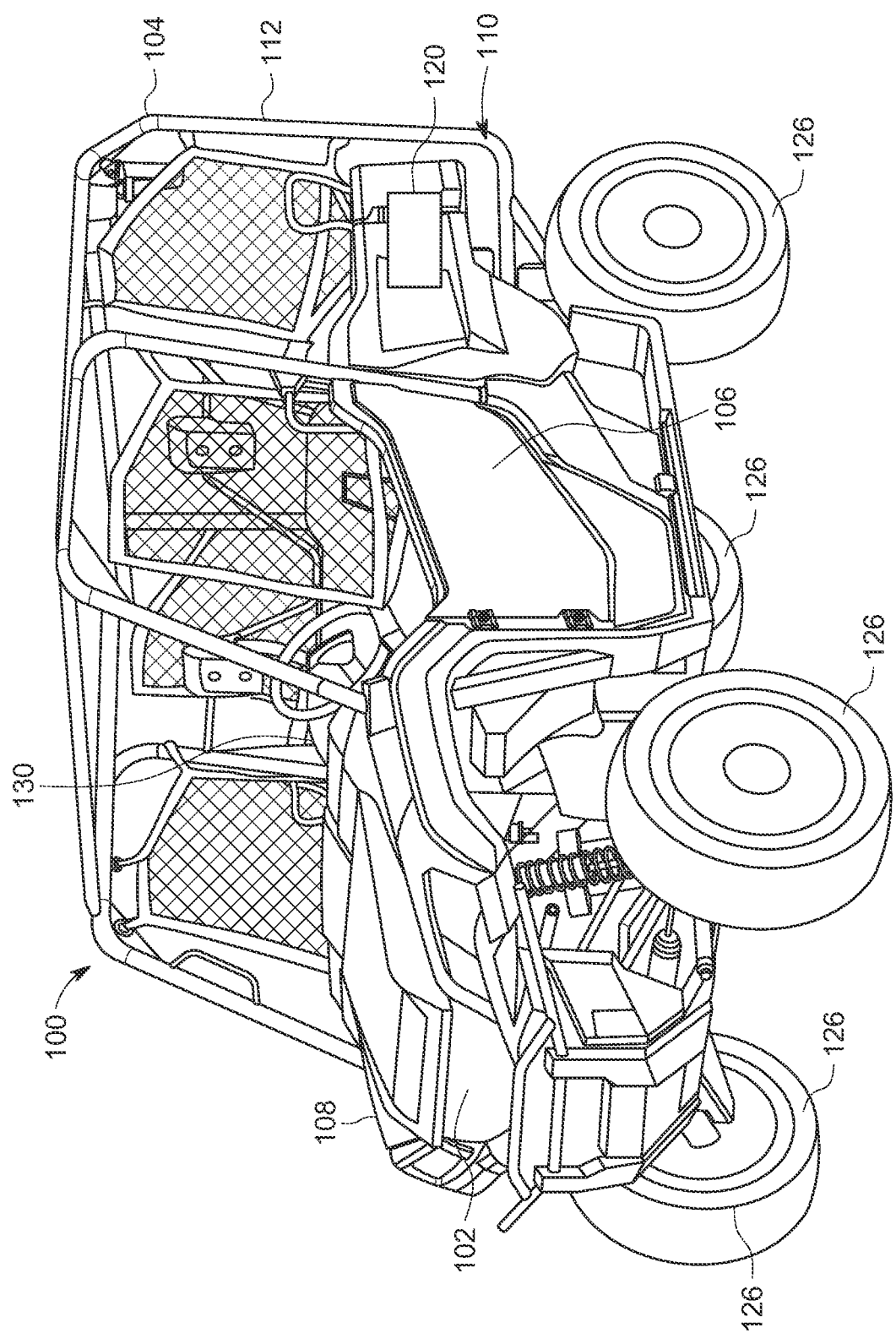
FIG. 1 is a perspective view depicting a vehicle, in accordance with one embodiment of the present disclosure.

FIG. 1 illustrates a perspective view of a vehicle, indicated generally at 100, in accordance with one embodiment of the present disclosure. The vehicle 100 is shown as an off-road vehicle. However, the vehicles 100 in accordance with alternative embodiments can comprise any variety of vehicles, including automobiles, trucks, vans, recreational vehicles, utility vehicles, agricultural equipment, or construction equipment, for example.

The vehicle 100 may include a front end 102, a rear end 104, a first longitudinal side 106 (hereinafter referred to as a left side 106), a second longitudinal side 108 (hereinafter referred to as a right side 108), and a frame 110 having a plurality of frame members 112 for supporting various component and/or assemblies of the vehicle. The frame members 112 may be tubular and may be connected together by welding or fasteners, for example. The vehicle 100 includes an engine module 120 having an engine and a transmission assembly operatively connected to the engine and adapted to transmit power from the engine to a plurality of traction members 126, such as wheels, of the vehicle 100. In an embodiment, the engine 122 may be an internal combustion engine or an electric motor, of any suitable size and configuration for providing a motive power to the vehicle 100. In one embodiment, the engine module 120 may be supported by the frame 110 at a location behind seat benches 130, 132 (best shown in FIG. 2). However, in alternative embodiments, the engine module 120 may be located in a central or front portion of the vehicle 100.

Figure 2:
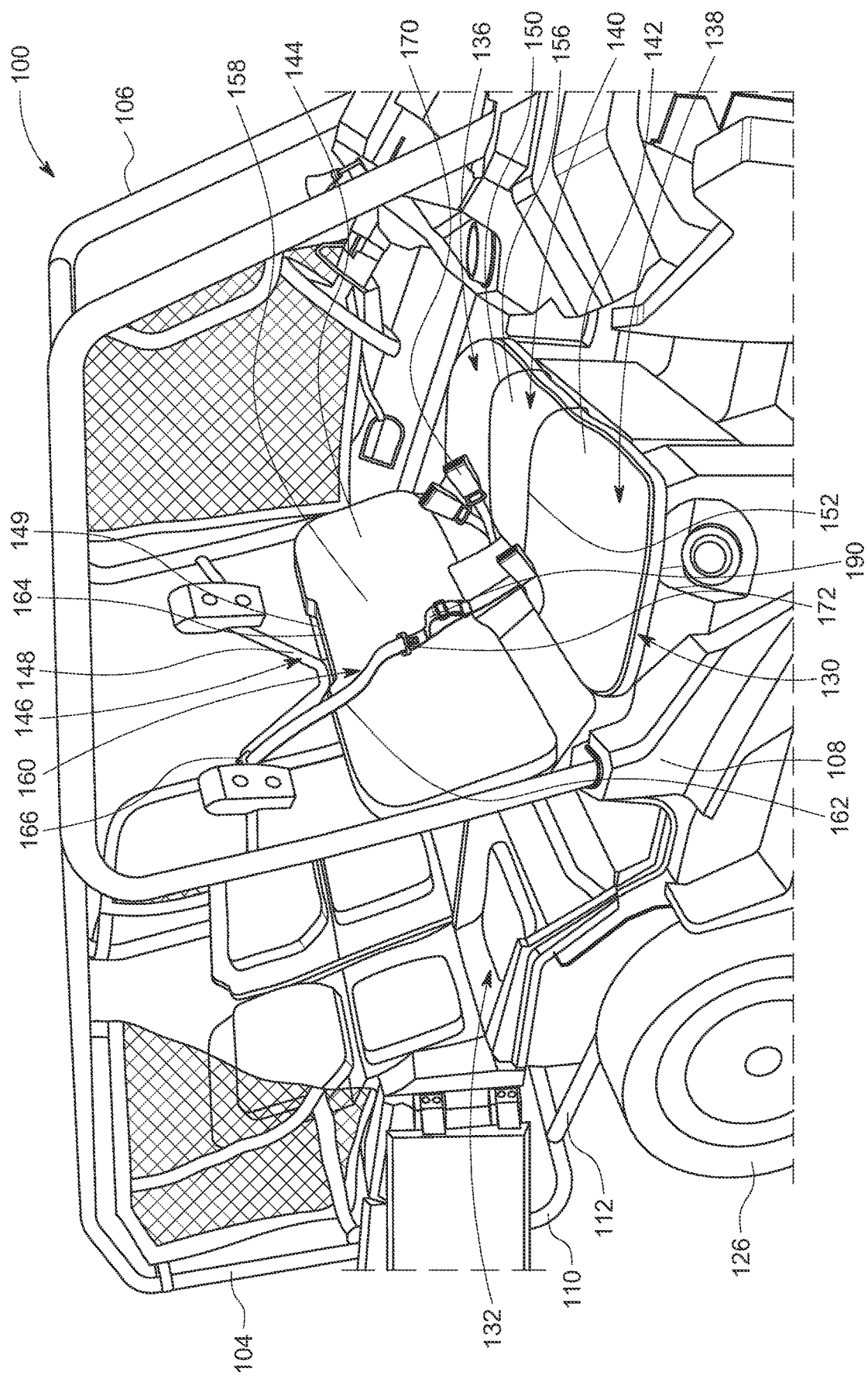
FIG. 2 is enlarged view of a portion of the vehicle depicting a front seat bench of the vehicle, in in accordance with one embodiment of the present disclosure.
Figure 3:
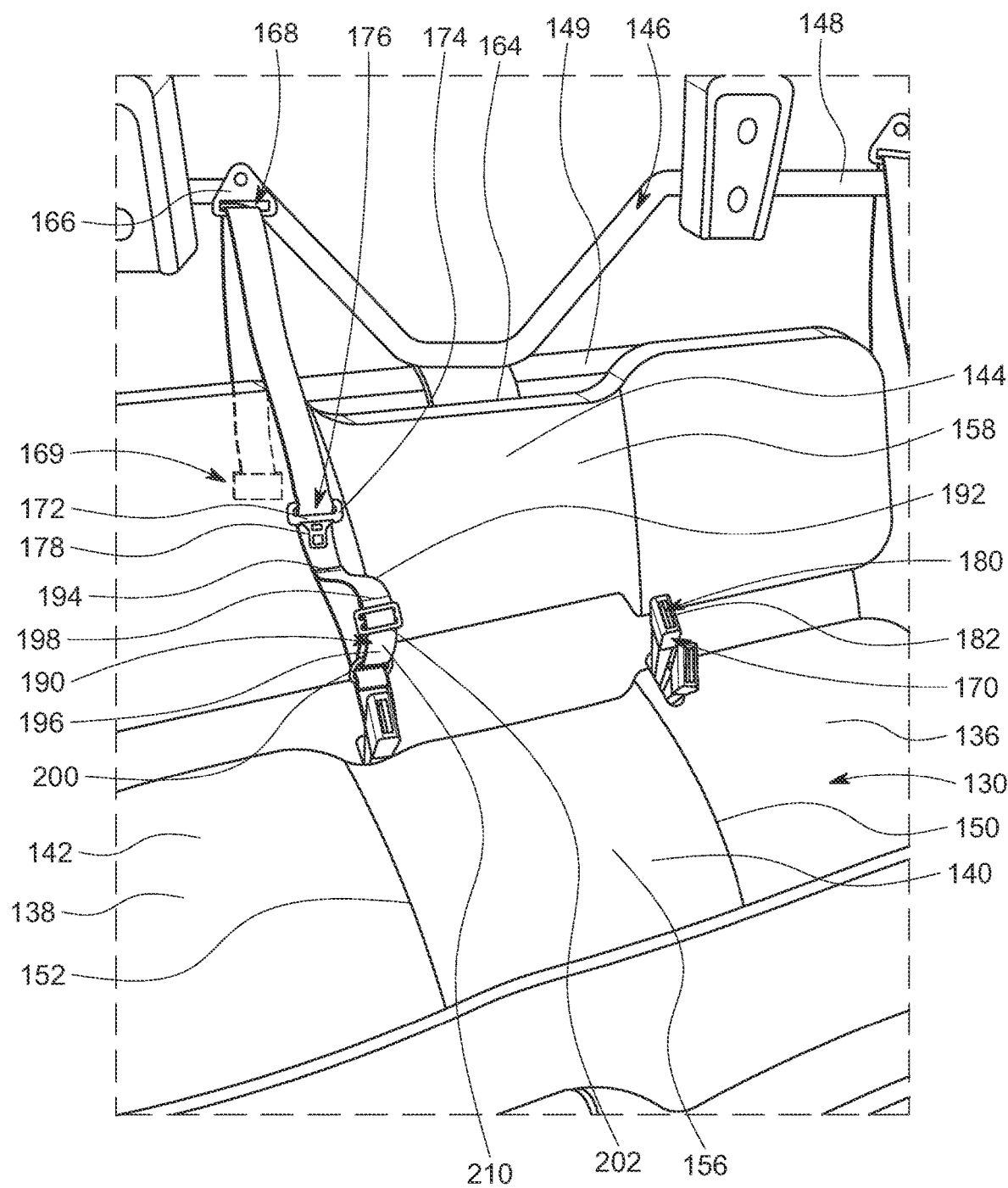
FIG. 3 is an enlarged perspective view of the front seat bench having a seat belt structure, and depicting a safety belt webbing disposed in a free position, in accordance with one embodiment of the present disclosure.
Figure 4:
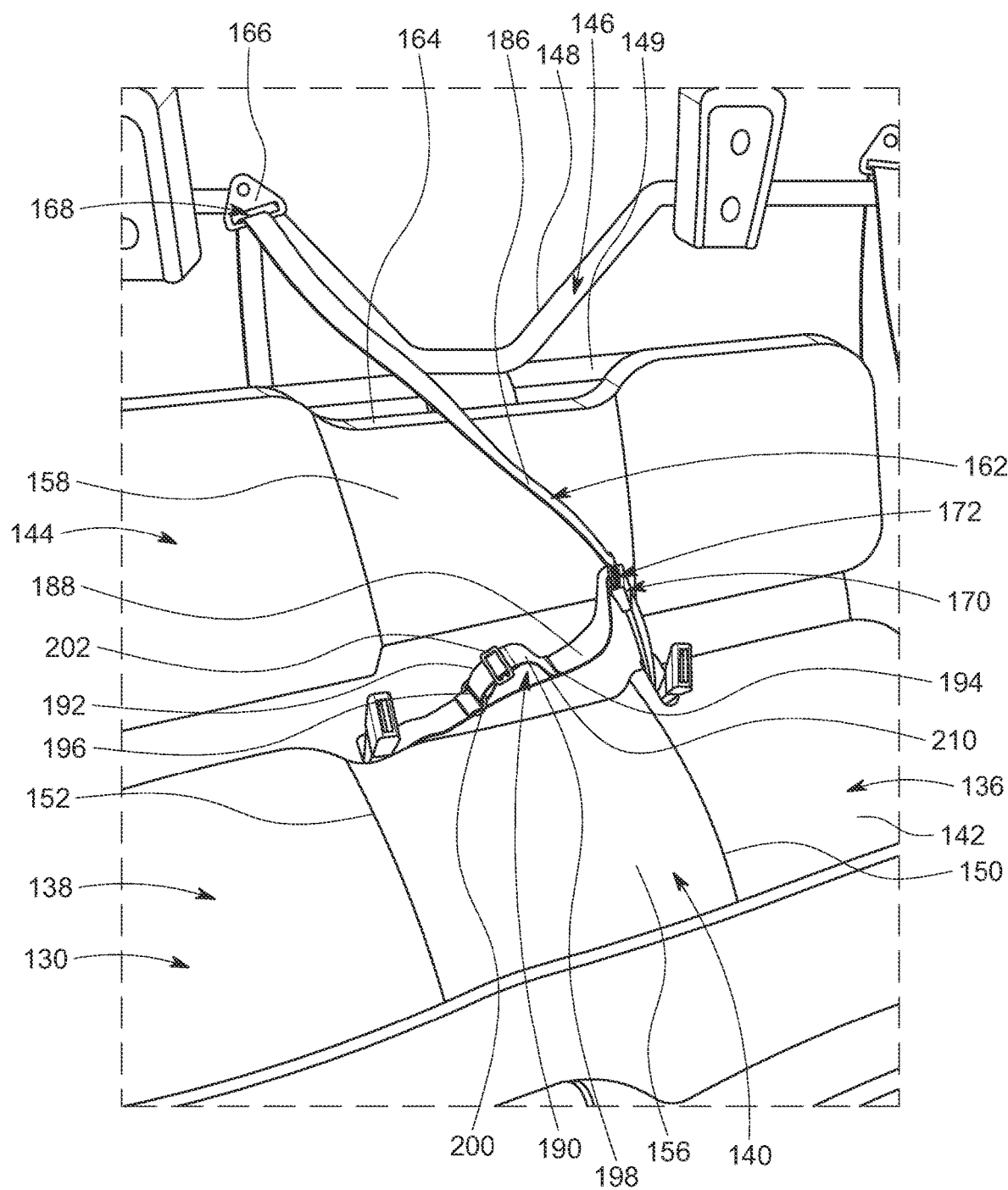
FIG. 4 is an enlarged perspective view of the front seat bench having the seat belt structure, and depicting the safety belt webbing disposed in an engaged position, in accordance with one embodiment of the present disclosure.

Referring to FIGS. 2, 3, and 4, the vehicle 100 includes a front seat bench 130 disposed proximate to the front end 102 and one or more rear seat benches 132 disposed distally from the front end 102. The front seat bench 102 includes a pair of side seats, for example a first side seat 136 and a second side seat 138, and a center seat 140 arranged between the pair of side seats 136, 138. The first side seat 136 facilitates a seating of a driver of the vehicle 100, while the second seat 138 facilitates a seating of an outboard passenger. As shown, the seat bench 130 includes a seat bottom 142 to support a seating of the passengers and a back support 144 for supporting backs of the passengers. Further, the seat bench 130 may include a frame 146 including a first crossbar 148 and a second crossbar 149 (best shown in FIG. 3 and FIG. 4) extending along a length of the seat bench 130 from the first longitudinal side 106 to the second longitudinal side 108. As shown, the first crossbar 148 and the second crossbar 149 extend along the back support 144 and provide a structural reinforcement to the back support 144 of the seat bench 130. As shown, the center seat 140 includes a first side 152 and a second side 150 disposed opposite to the first side 152, a seat portion 156 defined by a center portion of the seat bottom 142 and a back portion 158 defined by a center portion of the back support 144. It may be appreciated that the driver seat 136 (i.e. the first side seat 136) is arranged on the second side 150 of the center seat 140 (i.e. the seat portion 156), while the outboard passenger seat 138 (i.e. the second side seat 138) is disposed on the first side 152 of the center seat 140 (i.e. seat portion 156). Moreover, the center seat 140 includes a seat belt structure 160 for restraining an occupant (i.e. the center passenger) of the center seat 140.

The seat belt structure 160 includes a safety belt webbing 162 extending from the seat portion 156 towards a top end 164 (i.e. first end 164) of the back portion 158. As shown, the safety belt webbing 162 may be attached to a mount (not shown) fixedly attached to the seat portion 156 and arranged on a side (i.e. the first side 152) of the center seat 140 (i.e. the seat portion 156). Further, the mount may be located at location proximate to an intersection of the seat portion 156 to the back portion 158. As shown, the safety belt webbing 162 may extends upwardly from the seat portion 156 to a bezel 166 (best shown in FIG. 3 and FIG. 4) attached to the first crossbar 148. Further, the safety belt webbing 162 passes through an elongated channel 168 of the bezel 166 and extends downwardly along a rear of the back support 144. Further, the seat belt structure 160 may include a winch 169 (best shown in FIG. 3) for holding a portion of the safety belt webbing 162. It may be appreciated that the safety belt webbing 162 is extendable (reel out) from the winch 169 and may reel back on the winch 162. A portion of the safety belt webbing 162 may reel out from the winch 169 when a person, for example, the occupant of the center seat 140) pulls the safety belt webbing 162, while the portion of the safety belt webbing 162 may reel back automatically when the pull force is removed. In an embodiment, the safety belt webbing 162 may be made of polyester. Although, the safety belt webbing 162 made of polyester is contemplated, it may be envisioned that the safety belt webbing 162 may be made of any other suitable materials known in the art.

Figure 5:
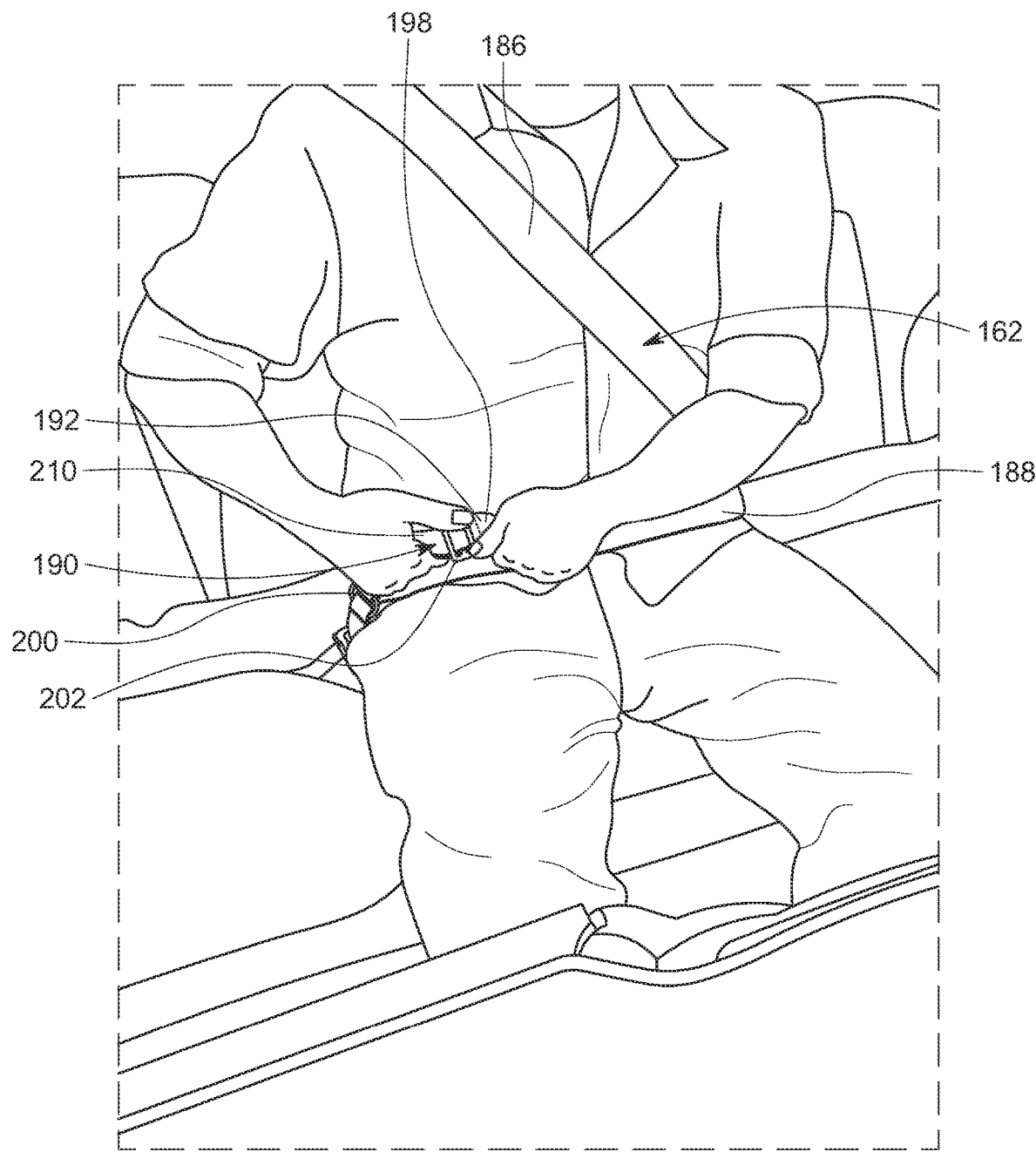
FIG. 5 is an enlarged view depicting a passenger seated on a center seat of the front seat bench and holing a grab structure of the seat belt structure, in accordance with one embodiment of the present disclosure.

Further, the seat belt structure 160 includes a buckle 170 arranged/disposed at a side of the center seat 140 opposite to the side at which the mount is located. In an embodiment, the buckle is arranged on the second side 150 of the seat portion 156 (i.e. the center seat 140) and is connected to the seat portion 156. In an embodiment, the buckle 170 may be located proximate to the intersection of the seat portion 156 the back portion 158. The buckle 170 is adapted to couple with the safety belt webbing 162 via a tongue 172 and facilitates a retention of the safety belt webbing 162 in an engaged position (shown in FIG. 4 and FIG. 5). As shown in FIG. 5, in the engaged position, the safety belt webbing 162 is adapted to extend diagonally across a toros of the occupant of the center seat 140 and is also adapted to extend along a lap of the occupant of the center seat. Upon a disengagement of the safety belt webbing 162 from the buckle 170, the safety belt webbing 162 moves to a free position (as shown in FIG. 3). In the free position, the safety belt webbing 162 may be disposed on the first side 152 of the center seat 140 and may extend from the seat portion 156 to the bezel 166 along the first side 152 of the center seat 140.

As best shown in FIG. 3, the tongue 172 is adapted to slide along a length of the safety belt webbing 162, and includes body portion 174 defining an elongated recess 176 through which the safety belt webbing 162 extends, and a tongue portion 178 for insertion/engagement with the buckle 170. As shown in FIG. 4, the tongue portion 178 extends inside a groove 180 of the buckle 170 when the tongue 172 is engaged with the buckle 170, and a retention mechanism (not shown) of the buckle 170 locks/retains the tongue portion 178 inside the groove 180 to keep the safety belt webbing 162 in the engaged position. The buckle 170 may also include a button 182 for facilitating a disengagement of the tongue portion 178 from the buckle 170. Upon an actuation of the button 182, the retention mechanism is disengaged from the tongue portion 178, enabling the disengagement of the tongue 172 from the buckle 170.

Further, referring to FIG. 4 and FIG. 5, when the tongue 172 is in engagement the buckle 170, the safety belt webbing 162 defines a should belt portion 186 and a lap belt portion 188. As shown, a portion of the safety belt webbing 162 extending from the seat portion 156 and the tongue 172 defines the lap belt portion 188, while a portion of the safety belt webbing 162 arranged between the bezel 166 and the tongue 172 defines the shoulder belt portion 186. Further, as shown in FIG. 5, when the tongue 172 is engaged with the buckle 170, the lap belt portion 188 is adapted to extend along the lap of the occupant and is adapted to engage with the lap of the occupant, while the shoulder belt portion 186 is adapted to extend diagonally across the torso of the occupant and adapted to restrain a forward movement of the torso of the occupant.

Further, again referring to FIG. 3 and FIG. 4, the seatbelt structure 160 includes at least one grab structure 190 coupled/engaged to the safety belt webbing 162. As shown, the grab structure 190 is arranged on the lap belt portion 188 when the tongue 172 is engaged with the buckle 170. The grab structure 190 may be disposed proximate to the first side 152 of the center seat 140 when the tongue 172 is connected/engaged with the buckle 170. In an embodiment, as shown, the grab structure 190 may include a strap 192 coupled to the safety belt webbing 162. As best shown in FIG. 4, the strap 192 may include a first end portion 194 attached to the safety belt webbing 162, a second end portion 196 coupled to the safety belt webbing 162, and a middle portion 198 disposed between and extending from the first end portion 194 and the second end portion 196. In some embodiments, the first end portion 194 is stitched with or adhesively attached to the safety belt webbing 162, while the second end portion 196 may be coupled to the safety belt webbing 162 via a D-ring 200 of the grab structure 190. Further, the grab structure 190 may include a length adjuster, for example, an adjuster ring 202, attached to the strap 192 to facilitate in an adjustment of length of the middle portion 198 of the strap 192. The adjuster ring 202 includes two elongated holes through which the middle portion 198 of the strap 192 passes and receives a portion of the second end portion 194 of the strap 192 after passing through the D-ring 200. In an embodiment, D-ring 200 may be omitted. In such a case, the adjuster ring 202 is attached to the safety belt webbing 162 and enables the coupling/attachment of the second end portion 196 of the strap 192 with the safety belt webbing 162. Further, the middle portion 198 of the strap 192 defines or acts as a handle 210 that is held by the occupant (shown in FIG. 5). In an embodiment, the occupant may hold the handle 210 (i.e. the grab structure 190) by a single hand or both the hands (as shown in FIG. 5). In an embodiment, the strap 192 is made of a material similar to the material of the safety belt webbing 162, and is made of polyester. Although, the strap 192 made of polyester is contemplated, it may be envisioned that the strap 192 may be made of any other suitable material known in the art. Further, in some embodiments, the strap 192 and the safety belt webbing 162 are made of different materials.

A functioning of the seat belt structure 160 of the vehicle 100 is now explained. During a movement of the utility vehicle 100 over a terrain, for example, a rough terrain, three people may be occupying the front seat bench 132 such that a driver is seated on the driver seat 136 for operating/driving the vehicle 100, a first passenger is seated on the outboard seat 138, and a second passenger (also referred to as the center passenger) is seated on the center seat 140. Before the driver moves/starts the vehicle 100, all the three passengers move the respective seat belts to engaged position. For example, the center passenger moves the safety belt webbing 162 to the engaged position by engaging the tongue 172 to the buckle 170. In the engaged position, the lap belt portion 188 engages with the lap of the center passenger, while the shoulder belt portion 186 extends diagonally across the torso of the center passenger to restrain the movement of the center passenger due to a jerk experienced during the travel of the vehicle. Further, the center passenger holds the grab structure 190 (i.e. the handle 210 or the middle portion 198 of the strap 192) disposed on the lap belt portion 188 to prevent a lifting of the center passenger from the seat portion 156 of the center seat 140. As the grab structure 190 is connected to the safety belt webbing 162, which in turn is connected to the frame 146 via the bezel 166, the winch 169, and the mount, a connection of the seat bottom 142 with the frame 146 using mechanical means can be avoided. Also, as the grab structure 190 is mounted on the safety belt webbing 162, a touching of legs of the driver or the outboard passenger by the center passenger, during a holding of the grab structure 190 by the center passenger, is avoided.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A seat belt structure for a center seat of a vehicle, the center seat including a seat portion and a back portion extending upwardly from the seat portion, the seat belt structure comprising:
   a safety belt webbing adapted to be mounted to a first side of the seat portion and configured to extend to a first end of the back portion;
   a buckle adapted to be mounted to a second side of the seat portion;
   a tongue movably connected to the safety belt webbing and adapted to move along the safety belt webbing, wherein the tongue is adapted to couple with the buckle to restrain an occupant of the center seat; and
   at least one grab structure engaged with the safety belt webbing and adapted to be held by the occupant,
   wherein the safety belt webbing defines a lap belt portion and a shoulder belt portion when the tongue is engaged with the buckle, the lap belt portion is adapted to traverse a lap of the occupant and the shoulder belt portion is adapted to extend diagonally across an upper torso of the occupant,
   wherein the at least one grab structure is engaged with the lap belt portion,
   wherein that at least one grab structure includes a strap attached to the safety belt webbing,
   wherein the strap extends along a length of the lap belt portion and includes
   a first end portion and a second end portion attached to the safety belt webbing, and
   a middle portion extending between the first end portion and the second end portion and defining a handle to be held by the occupant,
   wherein the at least one grab structure includes a length adjuster for adjusting a length of the middle portion of the strap.

2. The seat belt structure of claim 1, wherein the strap is made of polyester.

3. The seat belt structure of claim 1, wherein the tongue defines an elongated recess, wherein the safety belt webbing extends through the elongated recess.

4. The seat belt structure of claim 1 further including a winch for holding a portion of the safety belt webbing, wherein the safety belt webbing is extendable from the winch.

5. A vehicle, comprising:
a seat bench having a first side seat, a second side seat, and a center seat arranged between the first side seat and the second side seat, the center seat including a seat portion and a back portion extending upwardly from the seat portion; and
a seat belt structure to restrain an occupant of the center seat, the seat belt structure including:
a safety belt webbing fixedly mounted to a first side of the seat portion and extending to a first end of the back portion,
a buckle mounted to a second side of the seat portion,
a tongue movably connected to the safety belt webbing and adapted to move along the safety belt webbing, wherein the tongue is adapted to couple with the buckle to restrain the occupant of the center seat, and
at least one grab structure engaged with the safety belt webbing and adapted to be held by the occupant,
wherein the safety belt webbing defines a lap belt portion and a shoulder belt portion when the tongue is engaged with the buckle, the lap belt portion is adapted to traverse a lap of the occupant and the shoulder belt portion is adapted to extend diagonally across an upper torso of the occupant, and
wherein the at least one grab structure is engaged with the lap belt portion,
wherein the seat bench includes a frame having a crossbar disposed proximate to the first end of the back portion, and
the seat belt structure includes a bezel mounted to the crossbar, wherein the safety belt webbing extends through the bezel.

6. The vehicle of claim 5, wherein the at least one grab structure includes a strap attached to the safety belt webbing.

7. The vehicle of claim 6, wherein the strap is made of polyester.

8. The vehicle of claim 6, wherein the strap extends along a length of the lap belt portion and includes
a first end portion and a second end portion attached to the safety belt webbing, and
a middle portion extending between the first end portion and the second end portion and defining a handle to be held by the occupant.

9. The vehicle of claim 8, wherein the at least one grab structure includes a length adjuster for adjusting a length of the middle portion of the strap.

10. The vehicle of claim 5, wherein the tongue defines an elongated recess, wherein the safety belt webbing extends through the elongated recess.

11. The vehicle of claim 5, wherein the seat belt structure includes a winch for holding a portion of the safety belt webbing, wherein the safety belt webbing is extendable from the winch.

12. A seat belt structure for a center seat of a vehicle, the center seat including a seat portion and a back portion extending upwardly from the seat portion, the seat belt structure comprising:
a safety belt webbing adapted to be mounted to a first side of the seat portion and configured to extend to a first end of the back portion;
a buckle adapted to be mounted to a second side of the seat portion;
a tongue movably connected to the safety belt webbing and adapted to move along the safety belt webbing, wherein the tongue is adapted to couple with the buckle to restrain an occupant of the center seat; and
at least one grab structure engaged with the safety belt webbing, each grab structure including a strap defining a handle to be held by the occupant,
wherein the safety belt webbing defines a lap belt portion and a shoulder belt portion when the tongue is engaged with the buckle, the lap belt portion is adapted to traverse a lap of the occupant and the shoulder belt portion is adapted to extend diagonally across an upper torso of the occupant,
wherein the at least one grab structure is engaged with the lap belt portion,
wherein the strap extends along a length of the lap belt portion and includes
a first end portion and a second end portion attached to the safety belt webbing, and
a middle portion extending between the first end portion and the second end portion and defining a handle to be held by the occupant,
wherein the at least one grab structure includes a length adjuster for adjusting a length of the middle portion of the strap.

13. The seat belt structure of claim 12, wherein the strap is made of polyester.

14. The seat belt structure of claim 12, wherein the tongue defines an elongated recess, wherein the safety belt webbing extends through the elongated recess.

* * * * *